United States Patent
Tang et al.

(10) Patent No.: US 12,510,228 B2
(45) Date of Patent: Dec. 30, 2025

(54) LENS FOR A LAMP

(71) Applicant: SIGNIFY HOLDING B.V., Eindhoven (NL)

(72) Inventors: Danying Tang, Shanghai (CN); Liang Tian, Shanghai (CN)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/837,638

(22) PCT Filed: Feb. 14, 2023

(86) PCT No.: PCT/EP2023/053659
§ 371 (c)(1),
(2) Date: Aug. 12, 2024

(87) PCT Pub. No.: WO2023/156400
PCT Pub. Date: Aug. 24, 2023

(65) Prior Publication Data
US 2025/0137615 A1    May 1, 2025

(30) Foreign Application Priority Data

Feb. 17, 2022 (WO) ................ PCT/CN2022/076707
Mar. 24, 2022 (EP) .................................... 22164085

(51) Int. Cl.
*F21V 7/00* (2006.01)
*F21V 5/04* (2006.01)

(52) U.S. Cl.
CPC ............. *F21V 7/0091* (2013.01); *F21V 5/04* (2013.01)

(58) Field of Classification Search
CPC ........ F21V 7/0091; F21V 5/04; F21S 41/143; F21S 41/27; F21S 43/315
See application file for complete search history.

(56) References Cited

U.S. PATENT DOCUMENTS

| | | | |
|---|---|---|---|
| 8,068,288 B1 | 11/2011 | Pitou | |
| 10,077,883 B2* | 9/2018 | Huang | G02B 19/0028 |
| 2003/0156417 A1 | 8/2003 | Gasquet et al. | |
| 2008/0310159 A1 | 12/2008 | Chinniah et al. | |
| 2010/0259153 A1* | 10/2010 | Futami | F21S 43/247 |
| | | | 313/114 |
| 2011/0216543 A1 | 9/2011 | Kayanuma | |
| 2012/0240976 A1 | 9/2012 | Kuo | |

(Continued)

FOREIGN PATENT DOCUMENTS

| | | |
|---|---|---|
| CN | 103900026 B | 10/2017 |
| CN | 206741162 U | 12/2017 |

(Continued)

*Primary Examiner* — Erin Kryukova

(57) ABSTRACT

A lens for a lamp. The lens comprises a front or light-exiting surface, a reflective or side surface and a light incident or light receiving surface. The front surface comprises a portion that defines a stepped-shape cavity that extends into the lens. Part of the light that travels from the light incident surface to the portion of the front surface (defining the stepped-shape cavity) is transmitted, and another part is reflected towards the reflective surface. Light that travels from the light incident surface or the portion of the front surface (defining the stepped-shape cavity) to the reflective surface is redirected towards the front surface and out of the lens.

12 Claims, 4 Drawing Sheets

(56) References Cited

U.S. PATENT DOCUMENTS

2014/0204587 A1* 7/2014 Hukkanen ............... G02B 3/08
249/117
2016/0312977 A1 10/2016 Jiang et al.

FOREIGN PATENT DOCUMENTS

| CN | 207750936 U | 8/2018 | | |
|---|---|---|---|---|
| CN | 209782512 U | 12/2019 | | |
| DE | 202011051168 U1 | * | 1/2012 | ............. F21K 9/137 |
| DE | 102013210257 A1 | * | 12/2014 | ............ F21S 41/143 |
| JP | 2013069620 A | 4/2013 | | |

* cited by examiner

LENS FOR A LAMP

CROSS-REFERENCE TO PRIOR APPLICATIONS

This application is the U.S. National Phase application under 35 U.S.C. § 371 of International Application No. PCT/EP2023/053659, filed on Feb. 15, 2024, which claims the benefit of European Patent Application No. 22164085.7, filed on Mar. 24, 2022, and International Application No. PCT/CN2022/076707, filed on Feb. 17, 2022. These applications are hereby incorporated by reference herein.

FIELD OF THE INVENTION

The present invention relates to the field of lenses, and in particular, to lenses that employ total internal reflection.

BACKGROUND OF THE INVENTION

Is it extremely common for lamps or other light emitting devices to make use of lenses to provide a controlled beam distribution or beam angle. There is a recent trend for such lamps to make use of light-emitting diodes (LEDs) to improve the efficiency of producing light. There are a large number of standards for such lamps, such as MR16, PAR30, PAR38 and AR111, all of which make use of lenses to provide a defined beam angle.

There is an ongoing desire to improve the efficiency and characteristics of light output by lamps that use lenses. One area of interest would be in providing a lens that provides a desired beam angle with improved lighting characteristics.

SUMMARY OF THE INVENTION

The invention is defined by the claims.

According to examples in accordance with an aspect of the invention, there is provided a lens having a light incident surface, a reflective surface and a front surface.

The light incident surface is configured to transmit and/or refract light emitted from a light source through the light incident surface, into the lens and towards the reflective surface and the front surface.

The reflective surface is configured to extend from a first plane to a second plane, and has a shape configured to taper, about an optical axis, from the first plane to the second plane. The reflective surface is configured to provide total internal reflection to direct light, received from at least the light incident surface, towards the first plane;

The front surface has a first portion lying in the first plane and a second portion having a stepped shape symmetric about the optical axis, the stepped shape defining a cavity that extends into the lens. The first portion is configured to surround the second portion, The stepped shape of the second portion of the front surface comprises a series of steps, each step comprising a first step portion configured to transmit and/or refract light received directly from the light incident surface towards the first plane and a second step portion configured to reflect light received directly from the light incident surface towards the reflective surface.

The reflective surface is further configured to redirect light, received from the second step portion, towards the first plane.

Embodiments provide a lens having a stepped-shape cavity in the light-exiting surface (the front surface) of the lens. The stepped-shape cavity is configured to make the corresponding part of the front surface partially transmissive and partially reflective, so that some light incident on said part is transmitted through the front surface and some light is reflected towards the reflective (side) surfaces of the lens. This approach effectively redistributes light from the center of the lens to the side areas of the lens, to improve an illuminance uniformity across the front surface of the lens.

In some embodiments, for each second step portion, the angle between the optical axis and a tangent to the second step portion is in a range from 30° to 60°. This approach means that the second step portion may use a total internal reflection mechanism to reflect or direct light towards the reflective surface.

In some examples, the reflective surface comprises: a first internal reflection surface configured to reflect light received directly from the light incident surface, towards the first plane; and a second internal reflection surface, wherein: each second step portion is configured to direct light received directly from the light incident surface towards the second internal reflection surface of the reflective surface; and the second internal reflection surface is configured to reflect light received from any of the second step portions towards the first plane.

The second internal reflection surface may be configured to directly receive, from the light incident surface, less than 10% of the light transmitted and/or refracted by the light incident surface. Each second step portion may be configured to reflect/direct more than 80% of the light received directly from the light incident surface towards the second internal reflection surface of the reflective surface.

Optionally, the angle ($\theta_1$) between the first plane and a tangent to the first internal reflection surface is greater than the angle ($\theta_2$) between the first plane and a tangent to the second internal reflection surface. In other words, a tangent to the first internal reflection surface may be more inclined/sloped (with respect to the first plane) than a tangent to the second internal reflection surface. However, in some cases, $\theta_1$ may be less than $\theta_2$. In other examples, $\theta_1$ may be equal to $\theta_2$.

In some examples, the first and second internal reflection surfaces meet at an intermediate plane; and the smallest angle between a first hypothetical line and the first plane is greater than the smallest angle between a second hypothetical line and the first plane. The first hypothetical line extends from a point on the intermediate plane that intersects with an edge of the reflective surface to a closest point on the second plane that intersects with the edge of the reflective surface; and the second hypothetical line extends from a point on the first plane that intersects with the edge of the reflective surface to a closest point on the intermediate plane that intersects with the edge of the reflective surface.

Each first step portion may be convex within the cavity. However, this is not essential, and the skilled person would readily appreciate that the first step portion may be planar or concave within the cavity, the choice of which may depend upon the desired type of light distribution which may vary on a case-by-case basis.

In some examples, each first step portion is substantially planar and at a non-zero angle with respect to the first plane.

The reflective surface may be configured to direct light, received from the light incident surface and the second portion of the front surface, towards the first portion of the front surface.

In some examples, the reflective surface may be configured to direct more than 80%, and preferably more than 90%, of the light (directly) received from the light incident surface and the second portion of the front surface, towards the first portion of the front surface.

In particular examples, all light reflected by the reflective surface (received from the light incident surface and/or the second portion of the front surface) may be directed towards the first portion of the front surface. "All light" refers to the majority of light, i.e. discounting or ignoring any light that is absorbed or scattered (e.g. by imperfections) by the reflective surface. Thus, all light may refer to a majority of the light, e.g. >95% of light or >99% of light.

The first portion of the front surface may be configured to transmit light received from the reflective surface.

In some embodiments, a maximum width or diameter of the cavity defined by the stepped shape is less than 50% of the maximum width or diameter of the lens, wherein any width lies in direction parallel to the first plane. For instance, the maximum width or diameter of the cavity defined by the stepped shape may be less than 40% of the maximum width or diameter of the lens.

In some examples, the maximum depth of the cavity, in a direction perpendicular to the first plane, is less than 75% of the maximum depth of the lens, wherein any depth lies in direction perpendicular to the first plane.

The front surface may further comprise a third portion connecting the first portion to the second portion, the third portion extending from the first plane to a third plane lying between the first and second planes. The third plane may, for instance, lie between the first plane and the intermediate plane (if present). In some examples, the third plane and the intermediate plane are one and the same.

The third portion of the front surface may be (e.g., substantially) perpendicular to the first plane.

In some examples, the light incident surface is configured to: refract or direct a first fraction of light transmitted through the light incident surface source towards the reflective surface; and refract or direct a second fraction of light transmitted through the light incident surface towards the second portion of the front surface, wherein the first and second fractions sum to more than 90% of the light transmitted through the light incident surface. In some examples, the first fraction of light and second fraction of light are approximately equal.

The first fraction of light and the second fraction of light may each comprise at least a respective 40%, e.g., at least a respective 45%, of the light transmitted through the light incident surface.

There is also proposed a lamp comprising: a light source configured to emit light; and any lens herein described. The light source is positioned so that light emitted by the light source is directed towards the light incident surface of the lens. The lamp may further comprise a framework to couple the lens to the light source and position the light source such that light emitted by the light source is directed towards the light incident surface of the lens.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
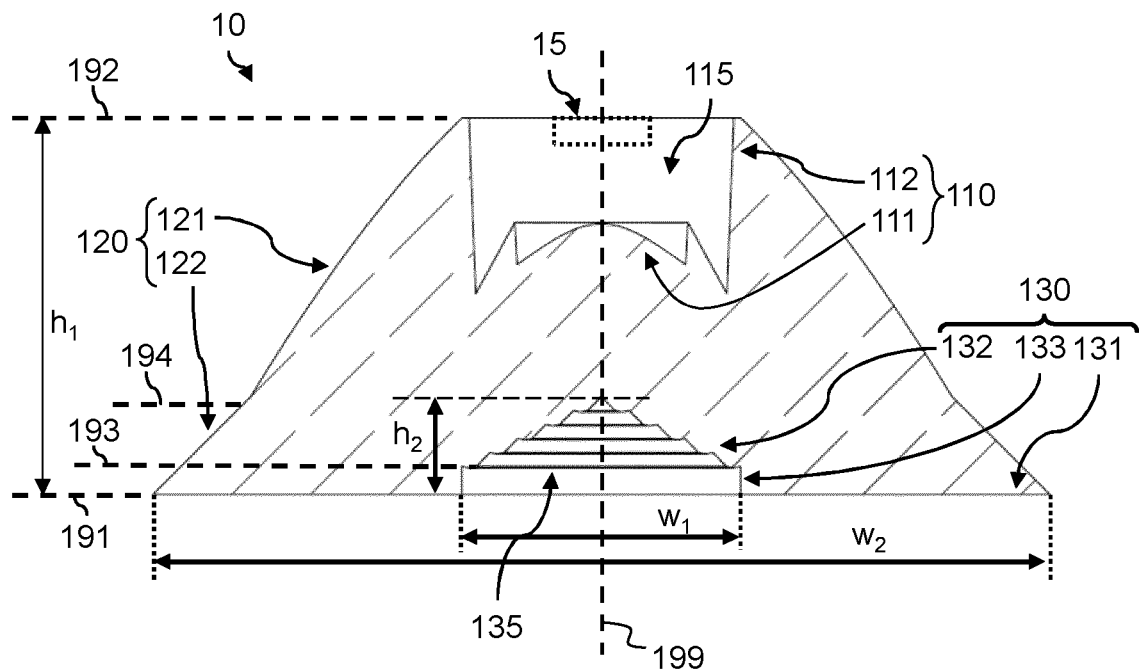
FIG. 1 is a cut-out view of a lens according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lens for a lamp. The lens comprises a front or light-exiting surface, a reflective or side surface and a light incident or light receiving surface. The front surface comprises a portion that defines a stepped-shape cavity that extends into the lens. Part of the light that travels from the light incident surface to the portion of the front surface (defining the stepped-shape cavity) is transmitted, and another part is reflected towards the reflective surface. Light that travels from the light incident surface or the portion of the front surface (defining the stepped-shape cavity) to the reflective surface is redirected towards the front surface and out of the lens.

Figure 2:
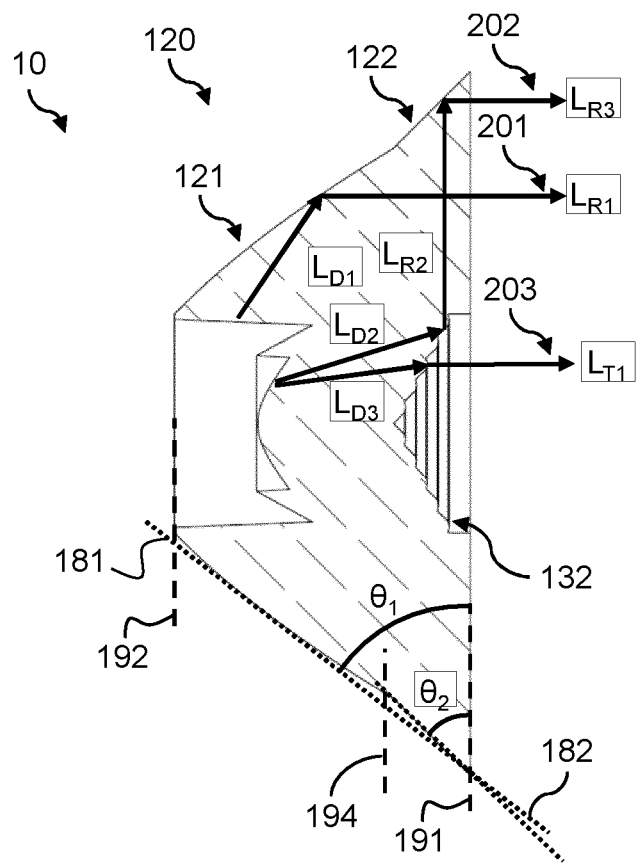
FIG. 2 illustrates light rays within a lens.

FIGS. 1 and 2 illustrate a lens 10 for a light source 15 according to an embodiment.

The lens 10 is formed of a light conducting material, such as glass or clear/translucent plastic, which conducts or allows the passage of light. The bounds of the lens 10 are defined by a light incident surface 110 (or "light receiving surface"), a reflective surface 120 (or "side surfaces") and a front surface 130 (or "light exiting surface"). The light incident surface 110 is configured to receive and transmit light emitted from the light source into the lens itself. The reflective surface 120 is configured or designed for redirecting light within the lens towards the front surface 130. The front surface 130 allows the transmission or emission of light out of the lens 10.

Thus, the lens 10 redistributes light emitted by the light source 15 to define a light beam out of the front surface 130 of the lens 10. The surfaces, and particularly the reflective surface 120, may be appropriately configured for achieving a desired beam angle of light output from the lens 10. Approaches for constructing or manufacturing a lens are well-known to the skilled person, and might include any standard lens production processes, including molding, grinding and coating procedures.

As previously explained, the light incident surface 110 is configured to receive and allow the transmission of light from an appropriately positioned light source 15 into the lens 10. The light incident surface 100 may be configured to surround an optical axis 199 of the lens 10.

In the illustrated example, the light incident surface 110 forms a light source cavity 115 into the lens 10. The light source may be positionable within this light source cavity 115. More particularly, the light source 15 may be positioned at the optical axis 199 of the lens 10.

The light incident surface 110 may be configured such that more than 90%, e.g., more than 95%, of the light transmitted through the light incident surface 100 is directed towards the reflective surface 120 and the first portion 132 of the front surface 130.

The light incident surface 110 comprises a central portion 111 and a surrounding portion 112, both of which are arranged symmetrically around the optical axis 199 of the lens. The surrounding portion 112 connects the reflective surface 120 to the central portion 111. The central portion 111 and the surrounding portion 112 together form the light source cavity 115.

The reflective surface 120 extends from a first plane 191 to a second plane 192. The shape of the reflective surface tapers about the optical axis 199, i.e., reduces in width/diameter, from the first plane 191 to the second plane 192. The reflective surface 120 may be symmetric about the optical axis 199, e.g. have near-infinite rotational symmetry about the optical axis 199. The optical axis 199 is perpendicular to the first plane 191.

The reflective surface 120 is configured such that light that originates from the light source 15, passes through the light incident surface 110 of the lens and is incident upon the reflective surface, is reflected or directed towards the first plane 191. More specifically, the reflective surface 120 is configured to provide total internal reflection to light, received directly from at least the light incident surface 100, towards the first plane 191. To improve the reflective performance, the reflective surface may be coated in a highly reflective material (e.g., foil or the like), which are well known in the art.

The shape of the reflective surface 120 may be defined by a desired beam width or beam angle for light exiting the lens. In particular, the greater the desired beam width/angle, the less gradual the tapering of the reflective surface about the optical axis 199.

The front surface 130 is formed of at least a first portion 131 and a second portion 132. The first portion 131 surrounds or encircles the second portion 132. The second portion 132 has a stepped shape that is symmetric about the optical axis 199. The stepped shape defines a cavity 135 that extends into the lens 10. More particularly, the cavity 135 extends towards the light incident surface 110.

In the illustrated example, the maximum width $w_1$ of the cavity 135 is less than 50% of the maximum width $w_2$ of the lens. The measures of width lie in any direction parallel to the first plane. In some examples, the maximum width $w_1$ of the cavity 135 is less than 40% of the maximum width $w_2$ of the lens 10.

The first portion 131 is configured to allow the transmission of light received from the reflective surface 120 out of the lens 10. Specifically, the first portion 131 is configured to permit the passage of light that originates from the light source, passes through the light incident surface 110 of the lens and is directed by the reflective surface 120 towards the first plane, to thereby allow light to exit the lens 10.

The second portion 132 is configured, for light received directly from the light incident surface 110, to transmit a first portion of the received light out of the lens 10 and re-direct a second portion of the received light towards the reflective surface 120. The reflective surface 120 then redirects this second portion of light towards the first plane 191, e.g., towards the first portion 131. In effect, the second portion 132 may redirect light received from the light incident surface laterally towards the reflective surface 120.

The second portion 132 is thereby partially transmissive and partially reflective.

The proposed approach of using a stepped-shape second portion 132 effectively splits the light that would otherwise be transmitted through a central portion of the front surface 130 into light that is transmitted through the central portion (the second portion 132), and light that is transmitted through the side portion (the first portion 131).

In this way, the center flux is distributed over a larger area. The proposed approach does not necessarily change the light beam angle produced by the lens, but will effectively disperse the flux from the center. This will reduce an apparent glare of a light arrangement comprising such a lens (compared to a light arrangement having a lens with no hereinproposed second portion of the front surface).

Embodiments in which the maximum width $w_1$ of the cavity 135 is less than 50% (e.g., less than 40%) of the maximum width $w_2$ of the lens are particularly advantageous, as they act to distribute only the most central portion of light directed towards the first plane.

The magnitude of the first portion may be no less than 40%, e.g., no less than 45%, of the light received directly from the light incident surface. The magnitude of the second portion may be no less than 40%, e.g., no less than 45%, of the light received directly from the light incident surface. This approach would improve an evenness or uniformity of distribution of the light.

In this way, the second portion effectively acts as a half-TIR surface, reflecting approximately half of received light energy from the center to the side area (the reflective surface), which is then transmitted towards the first plane. Another near-half of received light energy is transmitted through the second portion, in order to keep an average center energy.

The proposed approach will reduce a peak illuminance of light output by the lens (compared to a lens with no second portion of the front surface), and provide increased uniformity of light output by the lens.

The first portion 131 may be configured to lie substantially or generally in the first plane 191. The first portion 131 may, for instance, comprise a micro-lens array lying in the first plane 191 for distributing, dispersing or spreading light as it exits the lens 10. In another example, the first portion comprises a substantially planar surface.

The central portion 111 of the light incident surface 110 may be configured such that light incident on the central portion (from the light source 15 positioned in the light source cavity 115) is directed towards the second portion 132 of the front surface. In particular, the central portion may be configured such that that more than 75%, e.g., more than 90%, e.g., more than 95%, of the light incident on the central portion from the light source.

The surrounding portion 112 of the light incident surface 110 may be configured such that light incident on the surrounding portion (from the light source 15 positioned in the light source cavity 115) is directed towards the reflective surface 120.

The reflective surface 120 and the front surface 130 may be configured such that more than 90%, e.g., more than 95%, of the light that is directed by the reflective surface towards the first plane is incident upon the first portion 131 of the front surface 130. This approach avoids or reduces unintentional or undesirable scattering of the light within the lens, e.g., via (further) interaction with the second portion 132.

In the illustrated example, the reflective surface 120 is formed of two internal reflection surfaces 121, 122. A first internal reflection surface 121 is configured to receive light directly from the light incident surface 110, and redirect the received light towards the first plane 191. A second internal reflection surface 122 is configured to receive light directly from the second portion 132 of the front surface 130, and redirect the received light towards the first plane 191.

The second internal reflection surface 122 spans from the first plane 191 to an intermediate plane 194 (disposed between the first 191 and second 192 planes). The first internal reflection surface spans from the intermediate plane 194 to the second plane 192. Due to the tapering of the reflective surface 120, the width of the second internal reflection surface is greater than the width of the first internal reflection surface.

The light incident surface 110 and the reflective surface 120 are preferably configured so that more than 90%, e.g., more than 95%, of the light that travels directly from the light incident surface to the reflective surface is incident upon the first internal reflection surface 121. This can be achieved through appropriate design of the light incident surface and the reflective surface 120.

In particular, the surrounding portion 112 of the light incident surface 110 may be appropriately configured to direct light received from the light source 15 positioned in the light source cavity 115 towards the first internal reflection surface 121. In some examples, the surrounding portion 112 is configured such that more than 90%, e.g., more than 95%, of the light that travels directly from the light source 15 in the light source cavity 115 to the surrounding portion is directed towards the first internal reflection surface 121.

In some examples, the light incident surface 110 and the reflective surface 120 are preferably configured so that less than 10%, e.g., less than 5%, of the light that travels directly from the light incident surface to the reflective surface is incident upon the second internal reflection surface 122. This can be achieved through appropriate design of the light incident surface 110 and the reflective surface 120.

The reflective surface 120 and the second portion 132 of the front surface 130 are preferably configured so that more than 90%, e.g., more than 95%, of the light that travels directly from the second portion 132 of the front surface 130 to the reflective surface 120 is incident upon the second internal reflection surface 122. This can be achieved through appropriate design of the surfaces, appropriate examples of which are provided in this disclosure.

The light incident surface 110 may be configured to direct (e.g., using refraction) no less than 40%, e.g., no less than 45%, of the light received (directly) from the light source 15 towards the reflective surface 120. The amount of light directed by the light incident surface 110 can be defined by the shape of the light incident surface 110. This can be achieved through appropriate design of the central portion 111 and the surrounding portion 112 of the light incident surface 110.

The light incident surface 110 may be configured to direct (e.g., using refraction) no less than 40%, e.g., no less than 45%, of the light received (directly) from the light source 15 towards the second portion of the front surface. As previously noted, the amount of light directed by the light incident surface 110 can be defined by the shape of the light incident surface 110. This can be achieved through appropriate design of the central portion 111 and the surrounding portion 112 of the light incident surface 110.

With specific reference to FIG. 2, a first average angle $\theta_1$, being the average angle that the first internal reflection surface 121 makes with first plane 191 is greater than a second average angle $\theta_2$, being the average angle that the second internal reflection surface 122 makes with the first plane 191.

The first average angle $\theta_1$ could be defined as the angle between the first plane 191 and a tangent to the first internal reflection surface 121. The second average angle $\theta_2$ could be defined as the angle between the first plane 191 and a tangent to the second internal reflection surface 122.

Alternatively, the first and second average angles can be defined using first 181 and second 182 hypothetical lines. The first hypothetical line 181 extends from a point on the intermediate plane 194 that intersects with an edge of the reflective surface 120 to a closest point on the second plane 192 that intersects with the edge of the reflective surface. The second hypothetical line 182 extends from a point on the first plane 191 that intersects with the edge of the reflective surface 120 to a closest point on the intermediate plane 194 that intersects with the edge of the reflective surface.

The first average angle $\theta_1$ is the angle that the first hypothetical line 181 makes with the first plane 191. The second average angle $\theta_2$ is the angle that the second hypothetical line 182 makes with the first plane 191.

In other words, the first internal reflection surface 121 may be (on average) more steep/inclined/sloped with respect to the first plane 191 than the second internal reflection surface 122.

However, this is not essential, and in other embodiments the first internal reflection surface 121 may be (on average) less steep/inclined/sloped or equally steep/inclined/sloped with respect to the first plane 191 than/as the second internal reflection surface 122.

Turning back to FIG. 1, an optional feature of the front surface 130 is also illustrated, namely a third portion 133. The third portion 133 connects the first portion 131 to the second portion 132, and acts to effectively recess or portion the cavity 135 further into the lens 10 (i.e., to increase an effective depth of the cavity 135). The third portion 133 thereby extends or spans from the first plane 191 to a third plane 193. The third plane 193 is disposed between the first 191 and second planes 192, and may be disposed between the first plane 191 and the intermediate plane 194 (if present). In some examples, the third plane and the intermediate plane are one and the same.

The first portion 131 completely surrounds the third portion 133 and the second portion 132. As illustrated, the third portion 133 may be perpendicular to the first plane 191.

To provide sufficient room and/or space for light to travel directly from the light incident surface 110 to the reflective surface 120, in some examples, the depth or height $h_2$ of the cavity 135 may be less than 75% of the depth or height $h_1$ of the lens, e.g. less than 50% of the depth or height $h_1$ of the lens, e.g., less than 30% of the depth or height $h_1$ of the lens. The depths/heights are measured in a direction perpendicular to the first plane 191.

FIG. 2 illustrates a number of potential paths for light transmitted through the light incident surface 110 into the lens 10. This is useful for understanding the operation and purpose of the various surfaces of the lens 10.

A first ray 201 of light is transmitted from the light incident surface 110 directly to the reflective surface 120 (specifically, the first internal reflection surface 121). The reflective surface 120 is configured to redirect this first ray 201 towards the first plane 191, e.g., using total internal reflection. The first ray 201 is then transmitted out of the lens via the front surface, specifically, the first portion of the front surface. Thus, the first ray 201 is conceptually formed of a first direct ray $L_{D1}$ (representing the travel from the light incident surface to the reflective surface) and a first reflected ray $L_{R1}$ (representing the travel from the reflective surface to the first plane 191).

A second ray 202 of light is transmitted from the light incident surface 110 directly to the second portion 132 of the front surface. The second ray 202 is redirected towards the reflective surface 120, specifically the second internal reflection surface 122, by the second portion 132, e.g., using total internal reflection. The reflective surface is configured to redirect this second ray 202 towards the first plane 191. The second ray 202 is then transmitted out of the lens via the front surface, specifically, the first portion of the front surface. Thus, the second ray 202 is conceptually formed of a second direct ray $L_{D2}$ (representing the travel from the light incident surface to the second portion 132 of the front surface), a second reflected ray $L_{R2}$ (representing the travel from the second portion 132 to the reflective surface) and a third reflected ray $L_{R3}$ (representing the travel from the reflective surface to the first plane 191).

A third ray 203 of light is transmitted from the light incident surface 110 directly to the second portion 132 of the front surface. The second portion is configured to redirect this third ray 203 towards the first plane 191. The first ray 201 is thus transmitted out of the lens, via the second portion. Thus, the third ray 203 is conceptually formed of a third direct ray $L_{D3}$ (representing the travel from the light incident surface to the second portion) and a transmitted ray $L_{T1}$ (representing the travel out of the lens towards the first plane 191).

With continued reference to FIGS. 1 and 2, it has previously been mentioned how the second portion 132 of the front surface 130 is configured to transmit a first portion of the received light out of the lens and re-direct a second portion of the received light towards the reflective surface 120. The stepped shape or profile of the second portion 132 facilitates this effect.

Generally, a stepped shape is formed of a series of steps, each step comprising a first step portion and a second step portion. The steps decrease in width with distance from the first plane. The first step portion is configured to transmit and/or refract light received directly from the light incident surface towards the first plane. The second step portion configured to reflect light received directly from the light incident surface towards the reflective surface, and preferably the second internal reflection surface.

In this way, light incident on the second portion 130 is partially transmitted/refracted and partially reflected by the second portion.

In particular, each first step portion may be configured so that more than 90%, e.g., more than 95%, of the light that travels directly from the light incident surface to the first step is transmitted through the first step portion. Similarly, each second step portion may be configured so that more than 90%, e.g., more than 95%, of the light that travels directly from the light incident surface to the first step portion is redirected towards the reflective surface, and preferably the second internal reflection surface.

The size of the step portion(s) may be configured so that no less than 40% (e.g., no less than 45%) of light received directly from the light incident surface by the second portion of the front surface is transmitted through the front surface and that no less than 40% (e.g., no less than 45%) of light received directly from the light incident surface by the second portion of the front surface is reflected/redirected towards the reflective surface. This provides a more uniform distribution of light output by the lens.

Figure 3:
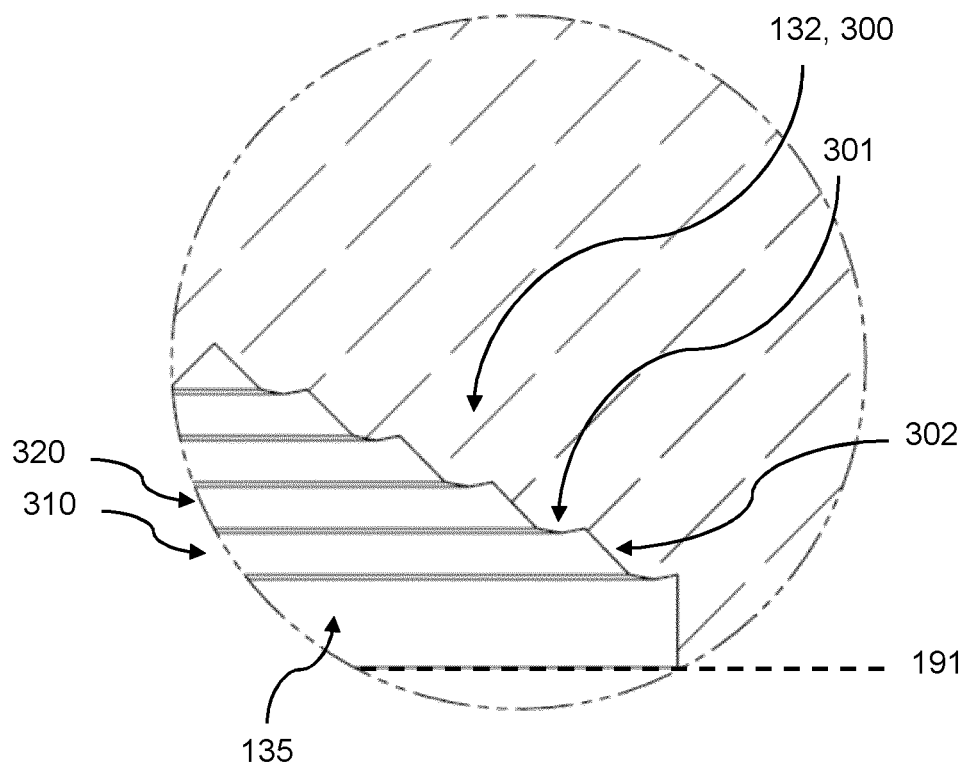
FIG. 3 is a cut-out view of part of a lens according to a first variation.

FIG. 3 illustrates a first stepped shape 300 for the second portion 132 that is used in some embodiments. As previously explained, the second portion defines a cavity 135 in the lens.

The first stepped shape 300 is formed of or comprises a series of steps 310, 320. Each step 310, 320 is conceptually shaped to form or bound a hypothetical frustum-like shape within the cavity 135. Each step comprises a first step portion 301 and a second step portion 302.

The first step portion 301 transmits light out of the lens, and is here formed to make a convex shape with respect to the cavity 135. More particularly, the first step portion 301 (and the light incident surface) may be configured so that more than 75%, e.g., more than 90%, e.g., more than 95%, of the light that travels directly from the light incident surface to the first step portion is transmitted out of the lens. The convex shape acts to control the shape of light output by the first step portion, and other shapes (e.g., concave or planar) may be used according to a desired light shape to be output by the lens.

The second step portion 302 reflects/redirects light received from the light incident surface to the reflective surface of the lens, and here comprises a flat or substantially planar surface that is inclined with respect to the first plane 191. More particularly, the second step portion 302 (and the light incident surface) may be configured so that more than 75%, e.g., more than 90%, e.g., more than 95%, of the light that travels directly from the light incident surface to the second step portion is reflected/redirected towards the reflective surface of the lens (e.g., towards the second reflective surface).

Figure 4:
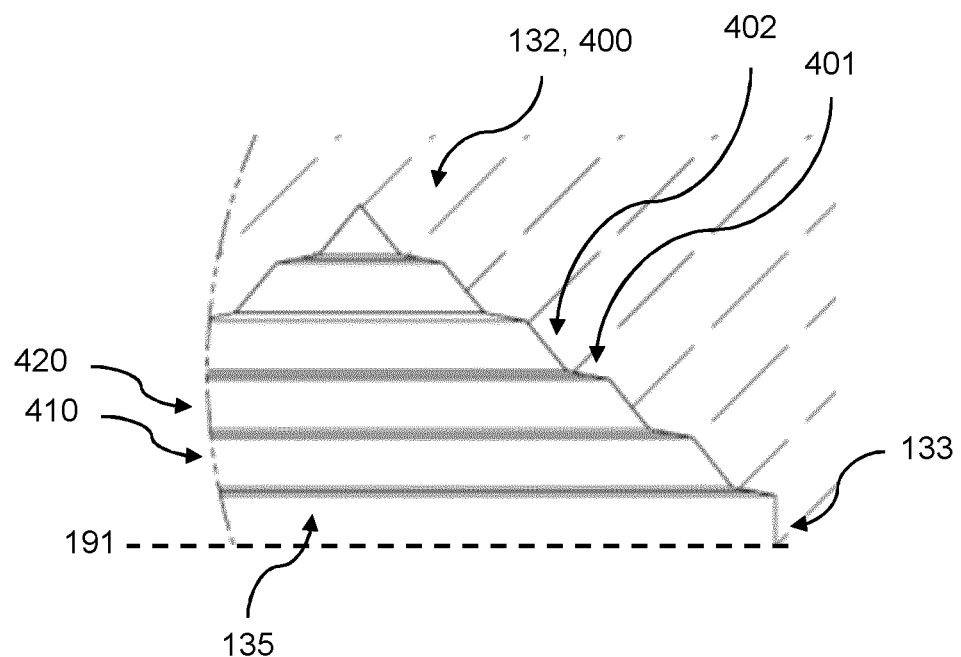
FIG. 4 is a cut-out view of part of a lens according to a second variation.

FIG. 4 illustrates a second stepped shape 400 for the second portion 132 that is used in some embodiments. As previously explained, the second portion defines a cavity 135 in the lens.

The second stepped shape 400 is formed of or comprises a series of steps 410, 420. Each step 410, 420 is conceptually shaped to form or bound a hypothetical frustum-like shape within the cavity 135. Each step comprises a first step portion 401 and a second step portion 402.

The first step portion 401 transmits light out of the lens, and is here formed of a flat or substantially planar surface that is inclined with respect to the first plane 191. The first step portion 401 is non-perpendicular to the first plane 191. More particularly, the first step portion 401 (and the light incident surface) may be configured so that more than 75%, e.g., more than 90%, e.g., more than 95%, of the light that travels directly from the light incident surface to the first step portion is transmitted out of the lens.

The second step portion 402 reflects/redirects light received from the light incident surface to the reflective surface of the lens, and here comprises a flat or substantially planar surface that is inclined with respect to the first plane 191. The second step portion 402 is non-perpendicular to the first plane 191. More particularly, the second step portion 402 (and the light incident surface) may be configured so that more than 75%, e.g., more than 90%, e.g., more than 95%, of the light that travels directly from the light incident surface to the second step portion is reflected/redirected towards the reflective surface of the lens (e.g., towards the second reflective surface).

In alternative examples, the first step portion 401 is not inclined with respect to the first plane 191, i.e., it parallel to the first plane.

The first step portion 401 has a lower inclination with respect to the first plane 191 than the second step portion 402. As is well known in optics, the angle of incidence that light makes with a surface light rays influences the amount of that light that is refracted and/or reflected by that surface. By inclining the step portions at different angles with respect to the first plane (and also the light incident surface), the amount of light that is reflected/refracted by each step portion is different. In particular, the amount of light that is reflected by the second step portion 402 will be greater than the amount of light that is reflected by the first step portion 401.

For each step, the second step portion 402 may be angled or positioned such that more than 75%, e.g., more than 90%, e.g., more than 95% of light that travels directly from the light incident surface to the second step portion undergoes total internal reflection.

To reduce or minimize any potential effect on beam angle, each second step portion and the second internal reflection surface may make a same (or nearly the same) angle to the first plane or optical axis. This approach means that the structure of the light incident surface 110 would or define the beam angle.

In any above described example, the first step portion 301, 401 may be designed or configured for spreading or distributing received light for a designed beam angle. This can be achieved through appropriate control of the shape of the first step portion, e.g., forming the first step portion of microlenses or the like, as well as controlling the spread of light through collaboration with the shape of the (central portion of the) light incident surface.

Each second step portion of any above described example may be configured such that the angle between the optical axis and a tangent to the second step portion, is in a range from 30° to 60°, e.g. 45°. This provides a mechanism for directing light towards the reflective surface, e.g., using total internal reflection.

Figure 5:
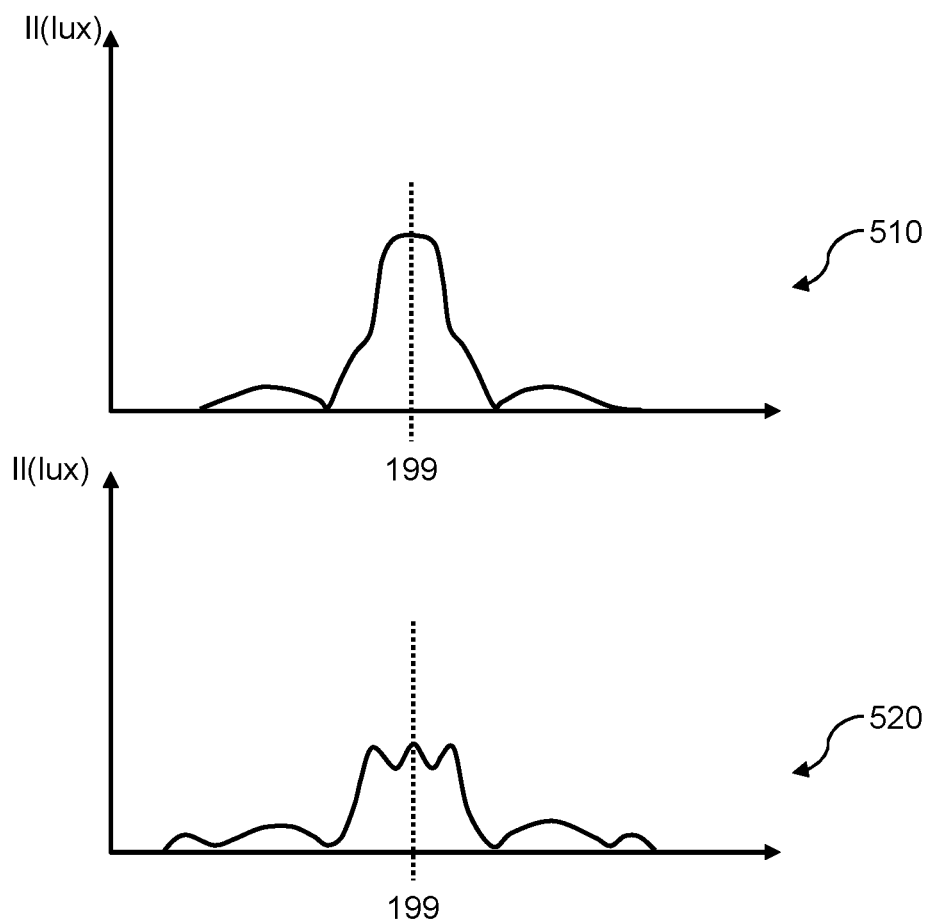
FIG. 5 provides comparative examples of illuminance in a cross-section of a plane.

FIG. 5 provides two graphs illustrating illuminance in a cross-section of the first plane, the cross-section passing through the optical axis of the lens.

A first graph 510, for the purposes of comparison, illustrates the illuminance Il(lux) in the cross-section of the first plane for a lens that does not comprise a second portion (of the front surface) that forms a cavity in the lens.

A second graph 520 illustrates the illuminance Il(lux) in the cross-section of the first plane for a lens that does comprise a second portion (of the front surface) that forms a cavity in the lens. The lens used to produce the second graph 520 had a second portion of the front surface having the second stepped shape 400.

In both graphs, the y-axis represents a magnitude of the illuminance, measured in lux. The x-axis represents a position along the first plane. A location of the optical axis 199 along this first plane has been indicated for ease of reference.

The illuminance for the second graph is more uniform across the lens than that shown in the first graph. This clearly demonstrates how use of the proposed approach provides a more uniform illuminance for a light arrangement having such a lens.

Figure 6:
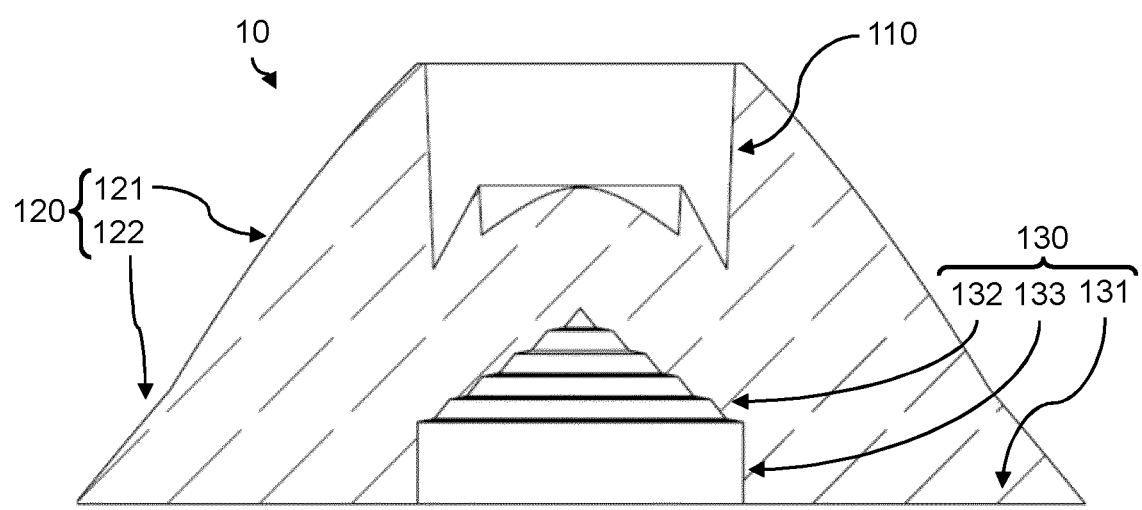
FIG. 6 is a cut-out view of a lens according to another embodiment.

FIG. 6 illustrates a different version of the lens 10.

The structure of the lens 10 is similar to the previously described lens and comprises a light incident surface 110, a reflective surface 120 and a front surface 130. The reflective surface 120 again comprises a first total internal reflection surface 121 and a second internal reflection surface 122. The front surface 130 also comprises a first portion 131, a second portion 132 and a third portion 133.

Compared to the previously illustrated lens, the third portion 133 extends into the lens to a greater extent. This provides an alternative structure for a lens.

Figure 7:
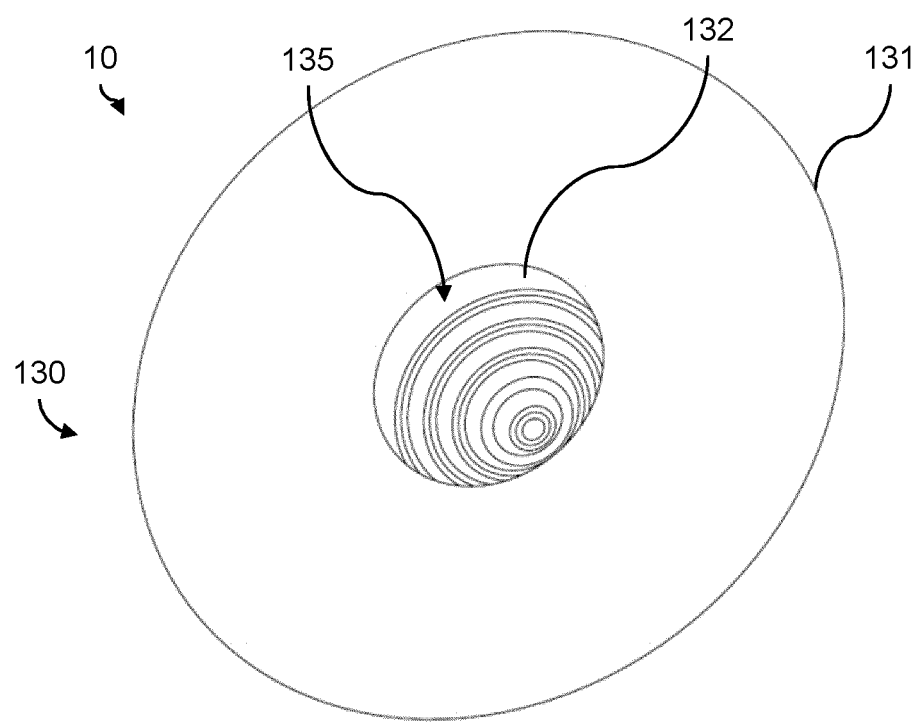
FIG. 7 is a view of the front surface of a lens.
Figure 8:
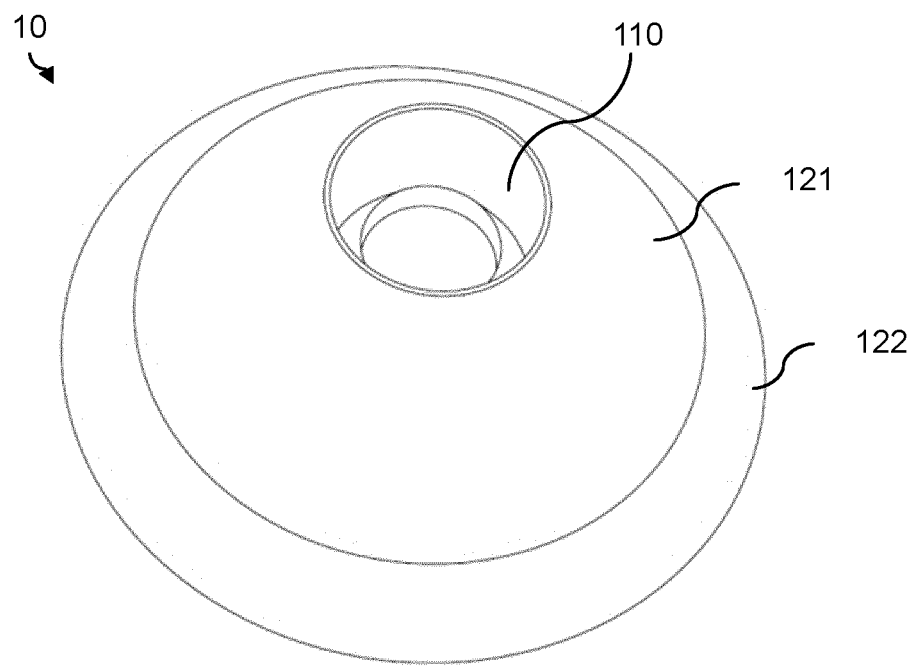
FIG. 8 is a view of the reflective surface and the light incident surface of a lens.

FIGS. 7 and 8 conceptually illustrate the exterior of any previously described lens. In particular, FIG. 7 provides a view of the front surface 130 of the lens and FIG. 8 provides a view of the reflective surface 120 and the light incident surface 130.

Any herein described lens may be combined with a light source to provide a lamp. The lamp may comprise, for instance, a framework to couple the lens to the light source. This framework may be configured to position the light source such that light emitted by the light source is directed towards the light incident surface of the lens. For instance, the lamp may be positioned within the light source cavity defined by the light incident surface. More particularly, the light source may be positioned at the optical axis of the lens.

In any described embodiment, if present, the light source cavity 115 may be relabeled a second cavity.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa. Any reference signs in the claims should not be construed as limiting the scope.

The invention claimed is:

1. A lens having a light incident surface, a reflective surface and a front surface, wherein:
   the light incident surface is configured to transmit and/or refract light emitted from a light source through the light incident surface, into the lens and towards the reflective surface and the front surface;
   the reflective surface is configured to extend from a first plane to a second plane, and has a shape configured to taper, about an optical axis, from the first plane to the second plane, wherein the reflective surface is configured to provide total internal reflection to direct light, received from at least the light incident surface, towards the first plane;
   the front surface has a first portion lying in the first plane and a second portion having a stepped shape symmetric about the optical axis, the stepped shape defining a cavity that extends into the lens, wherein the first portion is configured to surround the second portion,
   wherein the stepped shape of the second portion of the front surface comprises a series of steps, wherein each step decreases in width with distance from the first plane, each step comprising a first step portion configured to transmit and/or refract light received directly from the light incident surface towards the first plane and a second step portion configured to reflect light received directly from the light incident surface towards the reflective surface,
   wherein each first step portion is convex or planar within the cavity and the second step portion is substantially planar surface or inclined planar surface with respect to the first plane and configured to reflect/redirect more than 75% of the light from the light incident surface towards the reflective surface of the lens, wherein the reflective surface is further configured to redirect light, received from the second step portion, towards the first plane, and wherein a maximum width (w1) of the cavity defined by the stepped shape is less than 50% of the maximum width (w2) of the lens, wherein any width lies in a direction parallel to the first plane to distribute a central portion of light toward the first plane and wherein substantially half of the received light is transmitted toward the first plane and another half of the light is transmitted through the second portion to provide an average center energy, to reduce glare of a light arrangement including the lens.

2. The lens of claim 1, wherein, for each second step portion, the angle between the optical axis and a tangent to the second step portion, is in a range from 30° to 60°.

3. The lens of claim 1, wherein the reflective surface comprises:
a first internal reflection surface configured to reflect light ($L_{D1}$, $L_{R1}$), received directly from the light incident surface, towards the first plane; and
a second internal reflection surface, wherein:
each second step portion is configured to direct light ($L_{D2}$, $L_{R2}$) received directly from the light incident surface towards the second internal reflection surface of the reflective surface; and
the second internal reflection surface is configured to reflect light ($L_{R2}$, $L_{R3}$) received from any of the second step portions towards the first plane.

4. The lens of claim 3, wherein the angle between the first plane and a tangent to the first internal reflection surface is greater than the angle between the first plane and a tangent to the second internal reflection surface.

5. The lens of claim 1, wherein the reflective surface is configured to direct light, received from the light incident surface and the second portion of the front surface, towards the first portion of the front surface.

6. The lens of claim 5, wherein the first portion of the front surface is configured to transmit light received from the reflective surface.

7. The lens of claim 1, wherein the maximum width of the cavity defined by the stepped shape is less than 40% of the maximum width of the lens.

8. The lens of claim 1, wherein the maximum depth ($h_2$) of the cavity, in a direction perpendicular to the first plane, is less than 75% of the maximum depth ($h_1$) of the lens, wherein any depth lies in direction perpendicular to the first plane.

9. The lens of claim 1, wherein the front surface further comprises a third portion connecting the first portion to the second portion, the third portion extending from the first plane to a third plane lying between the first plane and the second plane.

10. The lens of claim 1, wherein the light incident surface is configured to:
refract a first fraction of light transmitted through the light incident surface source towards the reflective surface; and
refract a second fraction of light transmitted through the light incident surface towards the second portion of the front surface,
wherein the first and second fractions sum to more than 90% of the light transmitted through the light incident surface.

11. The lens of claim 10, wherein the first fraction of light and second fraction of light are approximately equal.

12. A lamp comprising:
a light source configured to emit light; and
the lens of claim 1, wherein the light source is positioned so that light emitted by the light source is directed towards the light incident surface of the lens.

* * * * *